(12) United States Patent
de Sousa et al.

(10) Patent No.: US 9,248,747 B2
(45) Date of Patent: Feb. 2, 2016

(54) CONVERTER FOR AN ELECTRICAL CIRCUIT DESIGNED TO SUPPLY ELECTRICAL PROPULSION POWER ON BOARD A MOTOR VEHICLE

(75) Inventors: Luis de Sousa, Eragny sur Seine (FR); Mame Fall, Conflans Sainte Honorine (FR); Stephane Fontaine, Clichy (FR)

(73) Assignee: Valeo Systemes de Controle Moteur, Cergy Pontoise Cedex (FR)

( * ) Notice: Subject to any disclaimer, the term of this patent is extended or adjusted under 35 U.S.C. 154(b) by 1008 days.

(21) Appl. No.: 13/306,109

(22) Filed: Nov. 29, 2011

(65) Prior Publication Data

US 2013/0134777 A1     May 30, 2013

(51) Int. Cl.
*B60L 1/00*     (2006.01)
*B60L 11/18*     (2006.01)
*B60L 15/00*     (2006.01)

(52) U.S. Cl.
CPC ........... *B60L 11/1805* (2013.01); *B60L 15/007* (2013.01); *B60L 2210/14* (2013.01); *Y02T 10/7005* (2013.01); *Y02T 10/7225* (2013.01); *Y10T 29/49117* (2015.01)

(58) Field of Classification Search
CPC ............ B60L 2210/14; B60L 11/1805; B60L 15/007; Y02T 10/7005; Y02T 10/7255
See application file for complete search history.

(56) References Cited

U.S. PATENT DOCUMENTS

| | | | |
|---|---|---|---|
| 5,245,233 A * | 9/1993 | Sudler | 310/49.01 |
| 5,781,419 A * | 7/1998 | Kutkut et al. | 363/17 |
| 6,552,606 B1 * | 4/2003 | Veltman et al. | 330/10 |
| 6,985,034 B1 * | 1/2006 | Prokin et al. | 330/251 |
| 2004/0100149 A1 | 5/2004 | Lai | |
| 2009/0033289 A1 * | 2/2009 | Xing et al. | 320/140 |
| 2009/0244943 A1 * | 10/2009 | Yamada et al. | 363/126 |
| 2009/0257257 A1 | 10/2009 | Adragna et al. | |

OTHER PUBLICATIONS

French Search Report issued in the corresponding French application No. 1055089, mailing date Apr. 6, 2011 (2 pages).
(Continued)

*Primary Examiner* — Rexford Barnie
*Assistant Examiner* — Terrence Willoughby
(74) *Attorney, Agent, or Firm* — Osha Liang LLP (57) ABSTRACT

An electrical circuit for supplying electrical propulsion power on board a motor vehicle is disclosed. The electrical power is obtained from power delivered to the electrical circuit by a battery of the vehicle and converted by at least two cells. The circuit includes inductive elements connected to transistors for managing the current flowing in the inductive elements, and the inductive elements are coupled to form a magnetic circuit. The magnetic circuit is alternatively controlled according to a common mode in which an apparent inductance of the said magnetic circuit is of the order of magnitude of the sum of the inductances specific to each inductive element, or according to a differential mode in which the apparent inductance of the said magnetic circuit is of the order of magnitude of the leakage inductance of the coupling between the said coupled inductive elements.

11 Claims, 6 Drawing Sheets

(56) References Cited

OTHER PUBLICATIONS

Calderon-Lopez G et al.: "High-Powered DUal-Interleaved ZVS Boost Converter with Interphase Transformer for Electric Vehicles", Applied Power Electronics Conference and Exposition, 2009. APEC 2009. Twenty-Fourth Annual IEEE, IEEE, Piscataway, NJ, USA, Feb. 15, 2009 (pp. 1078-1083).

Fei Yang et al.: "Designing of Coupled Inductor in Interleaved Critical COnduction Mode Boost PFC Converter", Energy Conversion Congress and Exposition, 2009. ECCE. IEEE, IEEE, Piscataway, NJ, USA, Sep. 20, 2009 (pp. 1876-1882).

* cited by examiner

| Switch State | | $V_{LA}$ | $V_{LB}$ | $V_{MC}$ | $V_{MD}$ |
|---|---|---|---|---|---|
| $S_{LA}$ | $S_{LB}$ | | | | |
| 0 | 0 | B | B | B | 0 |
| 0 | 1 | B | B-E | B-$\frac{E}{2}$ | $\frac{E}{2}$ |
| 1 | 0 | B-E | B | B-$\frac{E}{2}$ | -$\frac{E}{2}$ |
| 1 | 1 | B-E | B-E | B-E | 0 |

CONVERTER FOR AN ELECTRICAL CIRCUIT DESIGNED TO SUPPLY ELECTRICAL PROPULSION POWER ON BOARD A MOTOR VEHICLE

TECHNICAL FIELD OF THE INVENTION

The present invention relates to a converter for an electrical circuit designed to provide electrical propulsion power on board a motor vehicle.

BACKGROUND

Figures 1, 2:
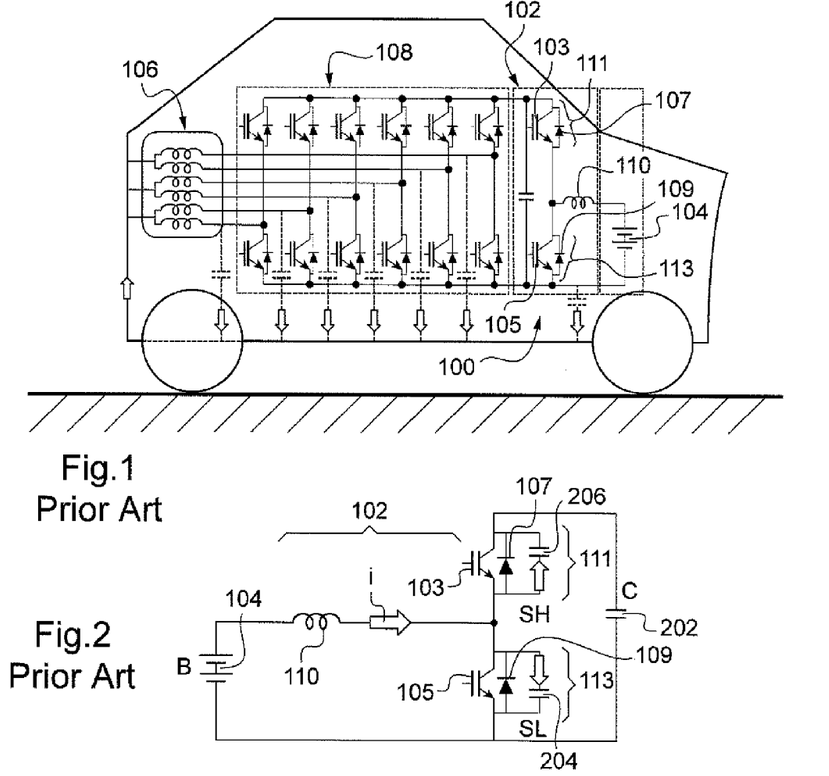
FIG. 1 shows a schematic view of a vehicle that has entirely or partially (hybrid) electrical propulsion, as is conventionally known in the art.
FIGS. 2 and 4 show electrical circuits used in known electrical converters.

With reference to FIG. 1, it is known practice to furnish a vehicle 100, that is totally or partially electrically propelled, with a power converter 102 capable of raising the voltage of a battery 104 in order to power an electrical machine 106, typically via inverters 108.

Because of the powers at work in such a converter 102, usually between 20 and 1000 kW, it may be worthwhile to make a multi-cell converter in which a power-supply current originating from the battery 104 is distributed amongst multiple conversion cells.

The use of such a multi-cell converter faces a problem of cost notably because of the quantity of silicon required by switches 111 and 113 used in a cell, and notably in their transistors 103 or 105 and their power diodes 107 or 109.

In the case of electrical vehicles and more particularly of hybrid vehicles, the volume and weight of these cells are also important criteria and, notably, the usually considerable size of the inductive elements—a coil 110 in this example—becomes problematic.

Efficiency is another important criterion for the use of a converter since the latter has a direct influence on the range of the vehicle 100.

In order to increase this efficiency, it is known practice to use inversion cycles of the current flowing in the inductive element 110 of the converter in order to use a switching method called ZVS, for "Zero Voltage Switching", as described below with reference to FIGS. 2 to 5.

More precisely, FIG. 2 illustrates such an opening of the switch 113 of the converter 102 under a practically zero voltage obtained by virtue of a capacitor 204 since, as described below, this capacitor 204 is discharged during this opening.

Figure 3:
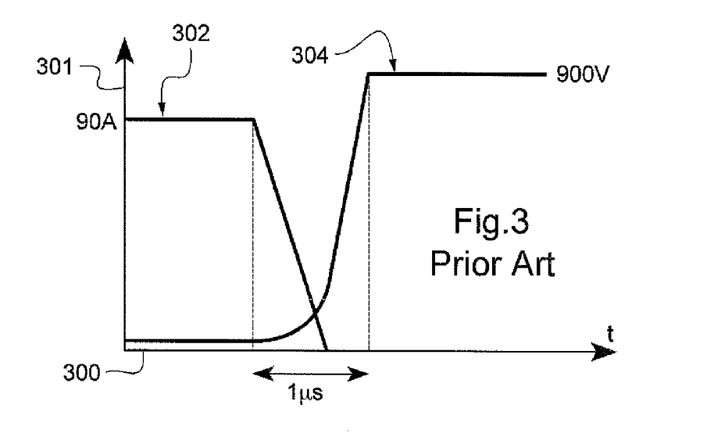
FIGS. 3 and 5 show variations of current and/or of voltage in known electrical converters.

Although the current 302 (FIG. 3) flowing in the collector of the transistor 105 is not totally zero when the voltage 304 at the terminals of the said transistor 105 (collector/emitter voltage) begins to increase, this method makes it possible practically to greatly reduce the losses associated with an opening of the switch 105. In the example of FIG. 3, the orders of magnitude at work are indicated as a key in the figure.

Consequently, the capacitor 204 can be discharged by inverting the current i passing through the inductive element 110 such that, with the capacitor 204 being thus discharged, the switch can again close under zero voltage.

Figure 4:
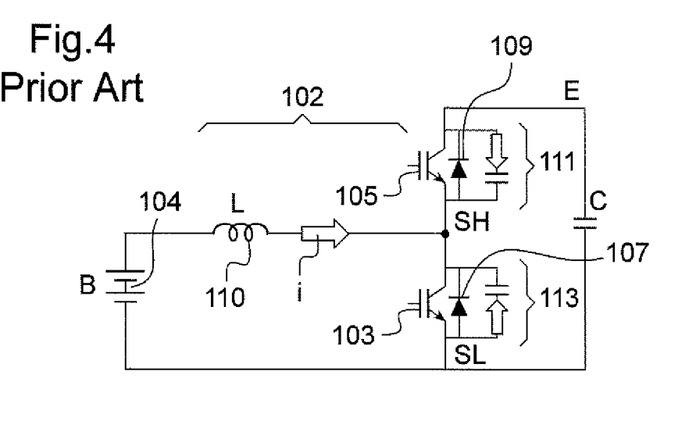

With reference to FIG. 4, the converter 102 is shown during such an inversion of the current i passing through the inductive element 110 of the cell, that is to say at the opening of the switch 111. Since the flow of current through the switches 111 and 113 is blocked, the capacitor 204 discharges, and then, when it is completely discharged, it places the diode 109 of the switch 113 in conduction.

In this case, the voltage 504 (FIG. 5) at the terminals of the switch 113 decreases rapidly during the discharging of the capacitor (step 510) and then becomes negative such that the diode 109 (step 512) is on-state.

Figure 5:
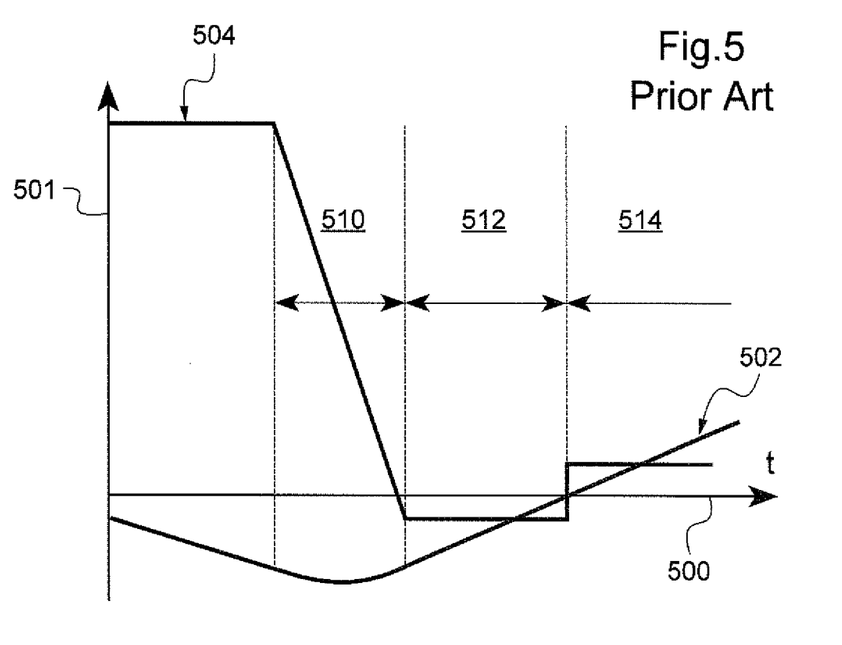

Consequently, the current 502 in the inductive element 110 becomes positive again and the cycle is repeated with an opening of the switch 113 as described above.

Although the use of this ZVS method with a fixed switching frequency may be satisfactory when the converter is operating at high load, it seems that this ZVS technique does not allow satisfactory efficiency at low load.

Figure 6:
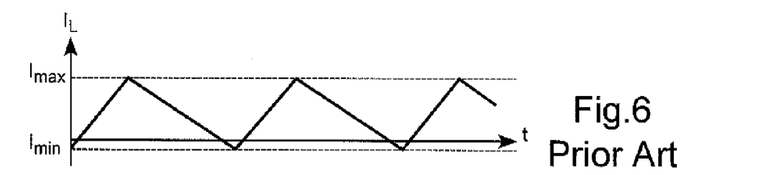
FIGS. 6, 7 and 8 show variations of current in a known electrical converter.
Figure 7:
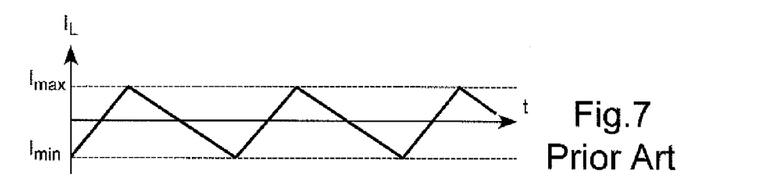

Specifically, it seems problematic that the current is greatly modulated irrespective of the load, whether it be at low load, that is to say when the average current is close to zero (FIG. 7) or in the case of a high load, that is to say when the average current is, for example, close to 50 A (FIG. 6). In this example, the inversion is of the order of 100 A peak-to-peak, which generates considerable iron losses in the inductor.

Figure 8:
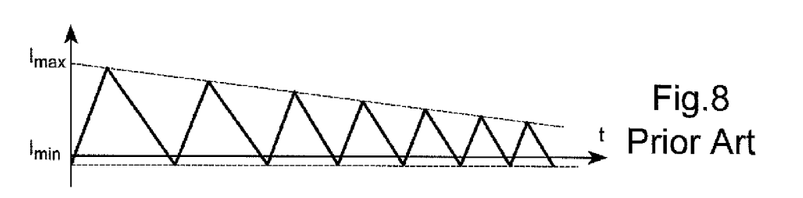

In order to alleviate this problem, it is known practice to use the ZVS method described above in a mode called critical conduction. In such a mode, the inversion of the current is forced for a time that is relatively short but sufficient to discharge the capacitor used to zero the voltage of the switch, as shown in FIG. 8.

In this case, the current is controlled by a first threshold which regulates the average value of the current and by a second threshold, with an opposite sign, which discharges the said capacitor, the alternation between these two thresholds being subjected to a variable frequency.

Problematically, it seems that this critical conduction mode generates current inversions in the inductive elements which make it difficult to design the latter. In truth, the amplitude of the current inversions may be greater than 100% of the value of the peak current over a high-frequency range (between 20 kHz and 80 kHz for example) which makes the power losses in the inductor unacceptable in terms of temperature rise and efficiency.

Finally, it should be pointed out that the inductive elements are usually manufactured based on materials of the ferrite or nanocrystalline type because of the resistivity of the material for the first and the thinness of the strips forming the core for the second, and because of their common capability to limit the generation of eddy currents and therefore to limit the losses.

Unfortunately, ferrite is a material which saturates with a relatively weak magnetic field relative to other, iron-based, magnetic materials.

The consequence is the considerable magnetic volume required to manufacture the inductive element, which may be unacceptable in a hybrid-vehicle application, or the limited power storage in these materials because of their very great permeability.

In terms of power storage, iron-based and silicon-based materials could be more suited to vehicle converters because their saturation threshold can sometimes exceed 2 Teslas. In addition, these materials are very widely used in power conveyance or conversion (transformer, generator, electric motor, etc.), usually in the form of laminated metal sheets.

Problematically, these materials have a high level of losses at high frequency because of the modulations of flux generated by these high frequencies. This is why the frequencies used in power conveyance vary across a relatively low range of frequencies, typically between 50 Hz and 1 kHz, with switching frequencies rarely exceeding approximately 10 kilohertz.

SUMMARY OF THE INVENTION

Embodiments of the invention solve at least one of the aforementioned problems. Its object is to allow the use of a ZVS method in critical mode while using high-saturation materials such as Fe—Si-based materials.

The invention results from the finding that it is possible to use a converter for a motor vehicle so as to obtain a current modulation per cell that is sufficiently high to use the ZVS method in a critical conduction mode while minimizing the modulation of the flux in the magnetic circuit so as to limit the power losses and to allow the use of high-saturation materials, notably Fe—Si-based materials.

Accordingly, the present invention relates to an electrical circuit designed to supply propulsion power on board a motor vehicle, this electrical power being obtained from power delivered by a battery of the said vehicle to at least two cells, comprising inductive elements connected to transistors managing the current flowing in the said inductive elements, characterized in that the inductive elements are coupled so that they form a magnetic circuit that can be alternately controlled:
  a. according to a common mode in which an apparent inductance of the said magnetic circuit is of the order of magnitude of the sum of the inductances specific to each inductive element, or
  b. according to a differential mode in which the apparent inductance of the said magnetic circuit is of the order of magnitude of the leakage inductance of the coupling between the said coupled inductive elements.

By virtue of the invention, it is possible to use an electrical circuit as a multi-cell converter capable of using a ZVS method operating in critical mode because the coupling of the inductive elements makes it possible to greatly reduce the inversions of flux in the whole magnetic circuit—according to the differential mode—while the current inversions in each cell are kept relatively high—according to the common mode.

Embodiments of the invention uses the coupling of inductors to form a main magnetic circuit used to store power, and a branch circuit creating leakage lines with a low inductance making it possible to obtain a greatly inverted current.

Further, materials which could not have been used in this type of converter with high frequencies and great current inversions can be introduced without generating unacceptable levels of "iron" losses, that is to say losses due to the flux inversions or modulations. Therefore, the invention makes it possible to reduce the volume of the magnetic materials used in converters since the latter accept much higher inductions.

In addition to the main features that have just been mentioned, the electrical circuit according to the invention may comprise one or more additional features amongst the following, considered in isolation or in all the possible technical combinations:
  a. the inductive elements are coupled such that they have a common terminal, connected to the power-supply battery, and a terminal connected to a pair of transistors controlling the charging and discharging of an associated capacitor.
  b. the associated capacitor has a terminal shared with a first pair of transistors of a first cell and a terminal shared with a second pair of transistors of the second cell.
  c. the electrical circuit comprises means for using a distinct 50% duty cycle for charging and discharging the capacitor.
  d. the value of the specific inductances is of the order of 500 µH
  e. the value of the leakage inductance is of the order of 50 µH
  f. the electrical circuit comprises means for controlling the discharging for a period sufficient for inverting the current flowing in at least one inductive element according, in this example, to a ZVS method in critical conduction mode.
  g. at least one of the inductive elements comprises an iron- and silicon-based material, typically ferrite.
  h. the electrical circuit comprises a magnetic circuit formed by four half-coils, interlaced with air gaps of one and the same structure, so as to form the coupling of the two inductive elements.

The present invention also relates to a method for manufacturing an electrical circuit according to the invention designed to provide electrical propulsion power on board a motor vehicle, this electrical power being obtained from power delivered to the said electrical circuit by a battery of the said vehicle and converted by at least two cells, for example according to a ZVS for "Zero Switching Value" method, comprising inductive elements connected to transistors managing the current flowing in the said inductive elements, characterized in that the inductive elements are arranged so as to couple the latter such that they form a magnetic circuit as described above.

BRIEF DESCRIPTION OF THE DRAWINGS

Other features and advantages of the invention will clearly emerge from the description given thereof below, as an indication and in no way limiting, with reference to the various appended figures as briefly described below.

DETAILED DESCRIPTION

The identical elements, by structure or by function, appearing in different figures retain the same references unless specified otherwise.

Figure 9:
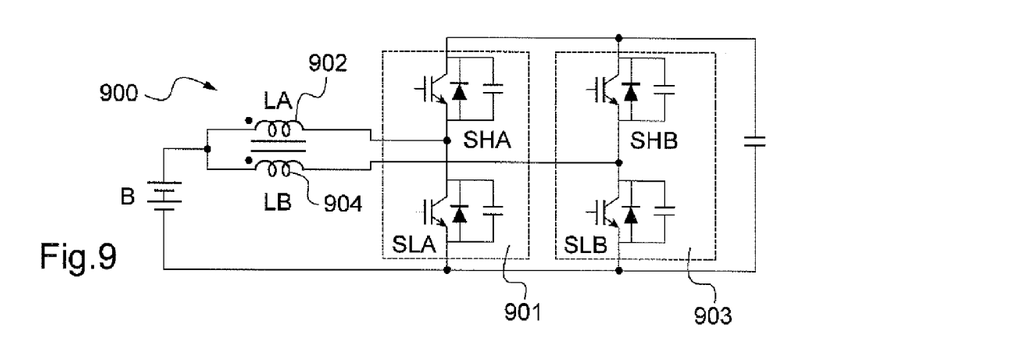
FIG. 9 shows an electrical circuit of a converter in accordance with one or more embodiments of the invention.

FIG. 9 shows a magnetic circuit 900 according to the invention, that is to say comprising two cells 901 or 903 furnished with respective inductive elements 902 and 904—represented by coils—coupled so as to be able to be alternately controlled according to a common mode in which an apparent inductance of the said magnetic circuit 900 is relatively high, for example of the order of magnitude of the sum of the inductances $L_A$ and $L_B$ specific to each of the said inductive elements 902 and 904.

By virtue of such a high apparent inductance, the inversions of the magnetic flux in the circuit are limited—as described in detail below—which reduces the iron losses. According to a differential mode in which the apparent inductance of the said magnetic circuit is relatively low, for example of the order of magnitude of the leakage inductance of the coupling between the inductive elements.

By virtue of such a low apparent inductance, the current can be inverted with a sufficiently great inversion that allows the use of the previously described ZVS method, notably in critical mode.

In the detailed description below of this application, the inductances of the inductive elements 902 or 904 shown by the coils are hereinafter called LA and LB.

The voltage Vmc of the magnetic circuit in common mode, hereinafter called the common mode voltage or "Vmc", is the sum of the voltages $V_{LA}$ or $V_{LB}$ at the terminals of the inductive elements 902 and 904.

$$Vmc=(V_{LA}+V_{LB})/2$$

Similarly, the voltage Vmd of the magnetic circuit in differential mode, hereinafter called the differential mode voltage or Vmd, is the difference of the voltages $V_{LA}$ or $V_{LB}$ at the terminals of the inductive elements 902 and 904.

$$Vmd=(V_{LA}-V_{LB})/2$$

Figure 10:
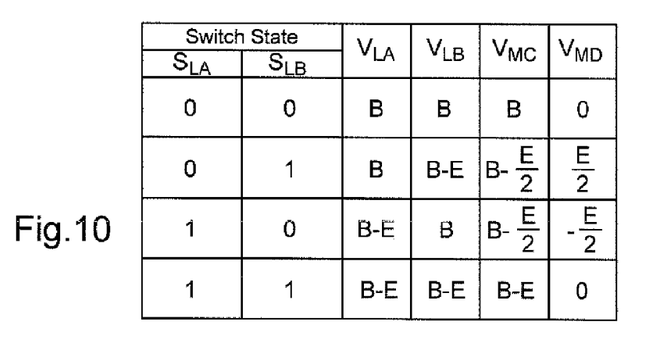
FIG. 10 shows a state indication table of switches used in the circuit of FIG. 9 in accordance with one or more embodiments of the invention.

This voltage Vmd in differential mode is not zero when the voltages $V_{LA}$ or $V_{LB}$ at the terminals of the two inductive elements differ. Considering an application as shown in FIG. 9 with two cells, this situation occurs when the switches $S_{LA}$ or $S_{LB}$ of the cells 901 or 903 using these inductive elements are in distinct states as indicated in the table of FIG. 10.

Figure 11:
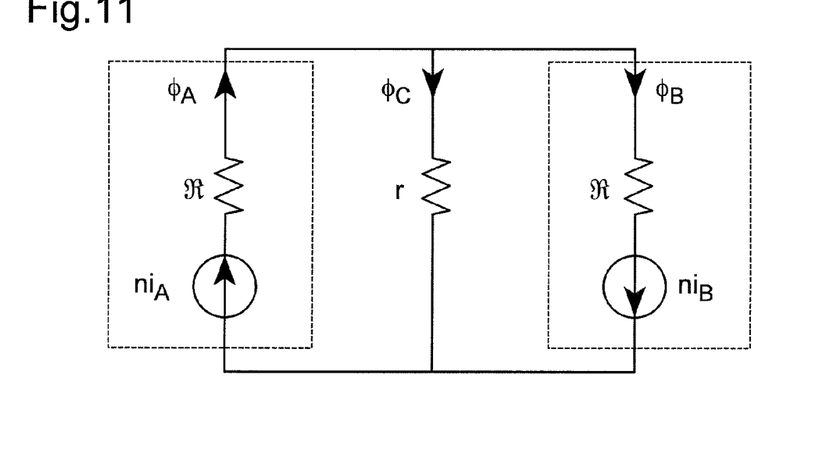
FIG. 11 shows a representation according to the Hopkinson model of the circuit of FIG. 9 in accordance with one or more embodiments of the invention.

For more clarity, it is possible to use a representation of the magnetic circuit 900 according to the Hopkinson method (FIG. 11). In this case, the inductive element 902 is represented by a reluctance R and a generator $ni_A$ of current $i_A$, the inductive element 904 is represented by a reluctance R and a generator $ni_B$ of current $i_B$ and, finally, the coupling between the two inductive elements 902 and 904 is equivalent to an inductive element 906 represented by a reluctance r.

The magnetic fluxes $\emptyset_A$, $\emptyset_B$ or $\emptyset_C$ generated respectively by each of the inductive elements 902, 904 or by the coupling of the latter may be determined by means of the following formulas:

$$\emptyset_A/N=L_A i_A+Mi_B$$

$$\emptyset_B/N=L_B i_B+Mi_A$$

$$\emptyset_C=\emptyset_A-\emptyset_B$$

In the proposed invention, the inductive elements are highly coupled and the value of the mutual inductance M is positive and of the order of 450 µH and the inductance L is of the order of 500 µH.

Typically, this mutual inductance M has a value close to the specific inductance $L_A$ or $L_B$ of each coil. Hereinafter, these specific inductances $L_A$ and $L_B$ are considered identical and equal to an inductance L.

The leakage inductance, equal to the difference between the specific inductance and the mutual inductance, is therefore relatively low and hereinafter called the leakage inductance Lf. This then gives:

$$\emptyset_A/N=L(i_A+i_B)-Lfi_B$$

$$\emptyset_B/N=L(i_A+i_B)-Lfi_A$$

$$\emptyset_C/N=Lf(i_A-i_B)$$

Based on the latter equations, the value of the voltage in common mode Vmc becomes:

$$Vmc=N[(d\emptyset_A/dt)+(d\emptyset_B/dt)]/2=(2L-Lf)[(di_A/dt)+(di_B/dt)]/2=(2L-Lf)(di_{MC})/dt$$

Similarly, based on these same equations above, the value of the voltage in differential mode Vmd becomes:

$$Vmd=N[(d\emptyset_A/dt)-(d\emptyset_B/dt)]/2=(Lf)[(di_A/dt)-(di_B/dt)]/2=Lf(di_{MC})/dt$$

As indicated above, the leakage inductance Lf is practically negligible compared with the specific inductance L of each inductive element. In this case, the voltages in common mode Vmc or in differential mode become:

$$Vmc=2L(di_{MC})/dt$$

$$Vmd=Lf(di_{MC})/dt$$

Figure 12:
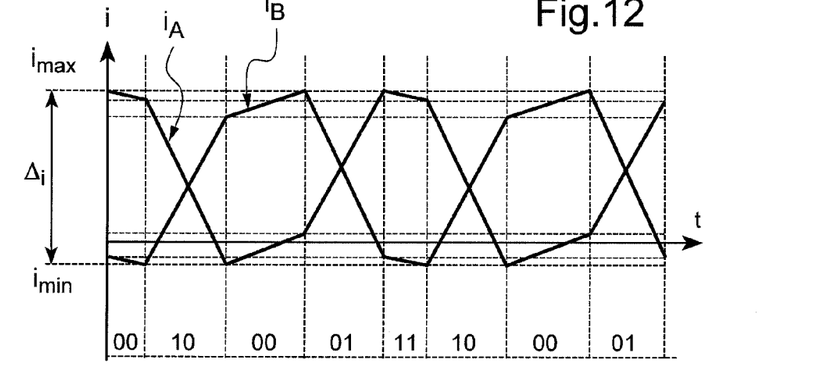
FIGS. 12 and 13 show variations respectively of current and of flux in the circuit of FIG. 9 in accordance with one or more embodiments of the invention.

It then seems that the inductance of the magnetic circuit in differential mode is of the order of the leakage inductance while the inductance of this same magnetic circuit in common mode is of the order of the sum of the specific inductances. Therefore, in differential mode, such a relatively low leakage inductance allows the current to vary rapidly, for example ten times faster than if the specific inductance were used, as shown in FIG. 12; while in common mode, such a relatively high specific inductance makes it possible to provide relatively low inversions of flux. Actually, the magnetic fluxes are given by:

$$\emptyset_A/N=L(i_A+i_B)-Lfi_B=2Li_{MC}-Lfi_B$$

$$\emptyset_B/N=L(i_A+i_B)-Lfi_A=2Li_{MC}-Lfi_A$$

$$\emptyset_C/N=Lf(i_A-i_B)=2Lfi_{MD}$$

Since the leakage inductance is relatively low, the derivative of the above equations leads to the equations below:

$$\Delta\emptyset_A/N=-Lf(\Delta i_B)$$

$$\Delta\emptyset_B/N=Lf\Delta i_A$$

$$\Delta\emptyset_C/N=2Lfi_A$$

Figure 13:
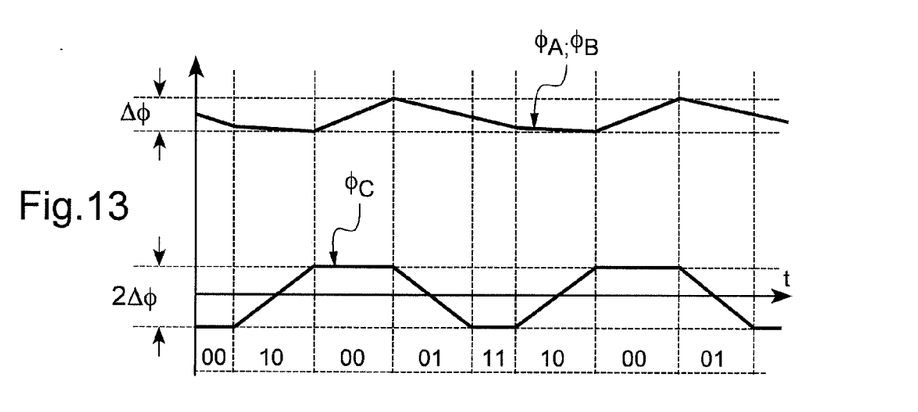

In other words, the inversions of flux are proportional to the leakage inductance which, being relatively low, imposes equally low inversions as shown in FIG. 13. These inversions are, in this instance, approximately 10 times lower than the inversions obtained without the coupling of the induction coils.

More precisely, it is possible to evaluate the rate of inversion relative to the peak magnetic field by knowing that the inversion of the current is practically equal to the peak current in critical conduction mode. In this case, this ratio becomes:

$$\Delta\emptyset_A/\emptyset_A=-Lf\Delta i_B/(2Li_{MC}-Lfi_B)\approx Lf\Delta i_B/2Li_{MC}=-Lf/L$$

$$\Delta\emptyset_B/\emptyset_B=Lf\Delta i_A/(2Li_{MC}-Lfi_A)\approx Lf\Delta i_A/2Li_{MC}=Lf/L$$

$$\Delta\emptyset_C/\emptyset_C=2Lf\Delta i_A/(2Lfi_{MD})\approx 2L/Lf$$

The above calculation shows that the inversion rate is practically equal to the ratio between the leakage inductance and the inductance specific to the inductive elements, this ratio then being able to be sufficiently low to allow the use of Fe—Si-based materials.

Figure 14:
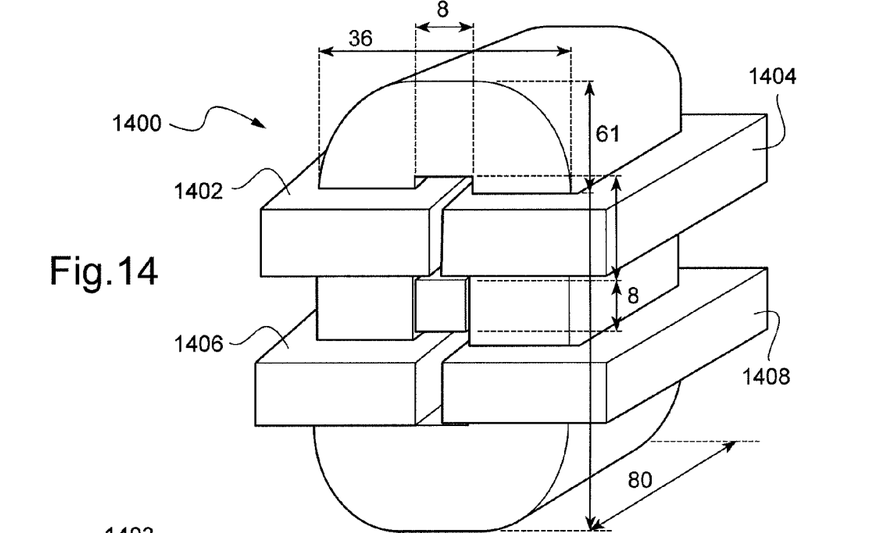
FIG. 14 shows a view in perspective of a coil capable of applying embodiments of the invention.

With reference to FIG. 14, a magnetic circuit 1400 according to the invention can be used by means of four half-coils 1402, 1404, 1406 and 1408 with N turns, each surrounding an air gap 1403, 1405, 1407 or 1409 (FIG. 15) allowing the adjustment of the inductance specific to each inductive element, and a central leg 1410.

This central leg 1410 sustains twice as many magnetic flux variations as the external arms. This is why it should be as short as possible in order to limit the iron losses because of these magnetic flux variations which are proportional to the volume of the said central leg.

Moreover, it should be noted that the length of this central leg 1410 has no effect on the operation of the magnetic circuit, its inductance being dependent on the section of the leg and of the air gap.

The coils with N turns are wound around air gaps in order to limit the magnetic radiation caused by the flux lines which separate at the air gap, the latter being able to be made of Fe—Si ferrite material in order to store power.

Figures 15, 16:
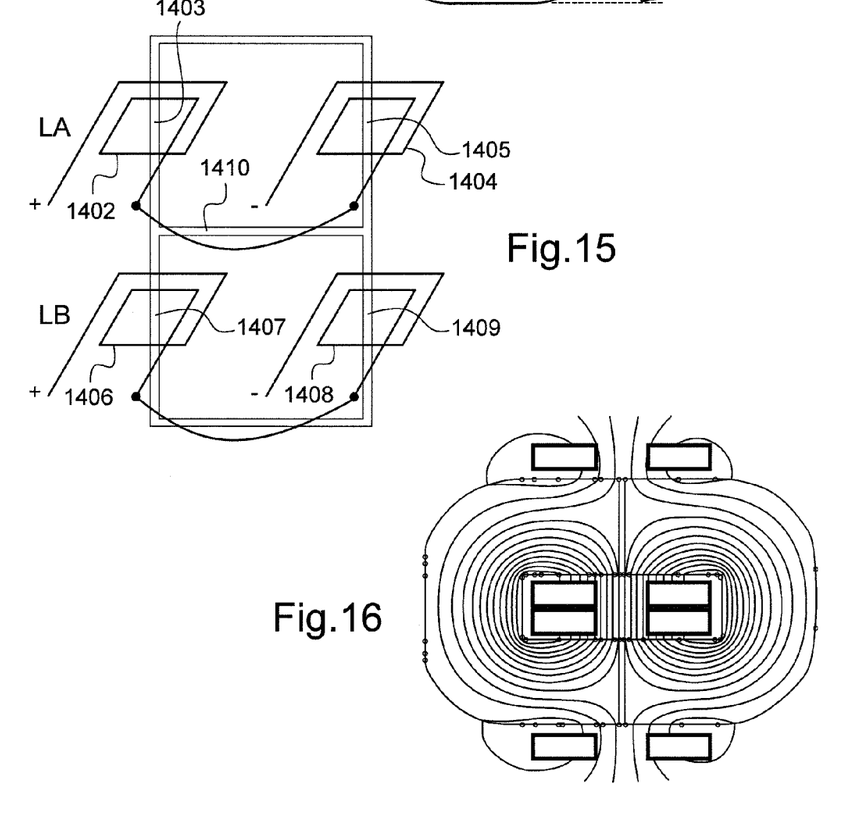
FIG. 15 shows an electrical representation of the coil of FIG. 14 in accordance with one or more embodiments of the invention.
FIG. 16 shows a variant of the coil described in FIG. 14 in accordance with one or more embodiments of the invention.

The coil may consist of conductive strips or of single-strand or multi-strand wire, the direction of coiling the windings A and B being such that the magnetic-drive forces (amperes-turns) of each of the windings are added. FIG. 15, which represents this magnetic circuit of FIG. 14, therefore shows the direction of the windings around the air gaps.

The present invention lends itself to many variants. Notably, the descriptions of the problem and of the invention have been made mainly by using uninsulated, bidirectional voltage step-down or step-up converters of the buck-boost type. However, it is clear that the invention can be used with various types of converter comprising at least two cells of which the inductive elements can be coupled.

Moreover, it should be pointed out that the invention can be applied with a fixed or variable frequency. Specifically, the converter can function in synchronous rectification. In this case, the frequency and the inductances must be calculated so that, even at maximum current, the current is reversed in the inductors so that the ZVS method can be used.

With respect to the use of a magnetic circuit, it is clear that the structure of the coil, notably the location of the air gaps, the presence of a central leg 1410 and the material used for the latter may vary from one embodiment of the invention to another.

Consequently, in an embodiment shown by field lines in FIG. 16 and the air gaps, a coil 1600 has no central leg and uses a C-shaped core.

Figure 17:
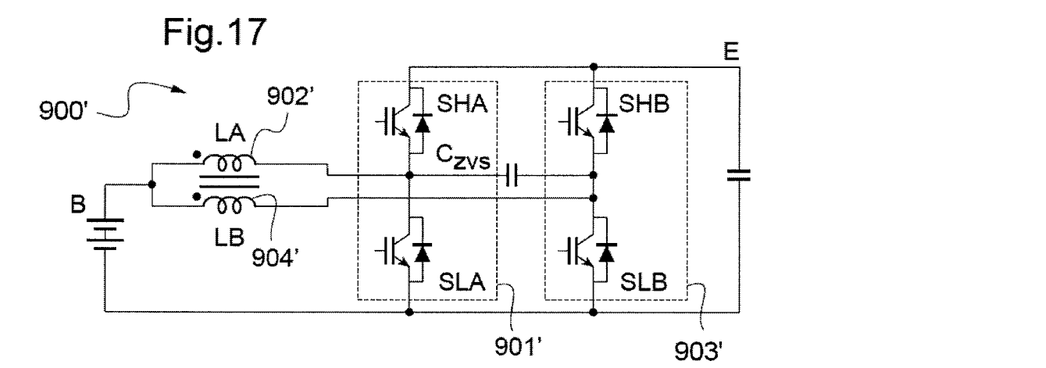
FIG. 17 shows a variant of the electrical circuit described in FIG. 9 in accordance with one or more embodiments of the invention.

FIG. 17 shows an electrical circuit 900' optimized so as to require only one capacitor, with a value of 2C, instead of 4 capacitors with a value C used in the circuit of FIG. 9.

This use of a single capacitor to carry out the ZVS method is possible through a choice of the conduction mode. Since at all times one of the two switches of each arm is in conduction, it is certain that, at the opening of a switch, the current of the inductor is absorbed by the capacitor which is connected either to earth or to a DC bus E.

If the duty cycle is less than 50% (FIG. 18) when the switch SLA opens, the switch SHB is in conduction. The capacitor Czvs is then biased under a negative voltage (−E).

Figure 18:
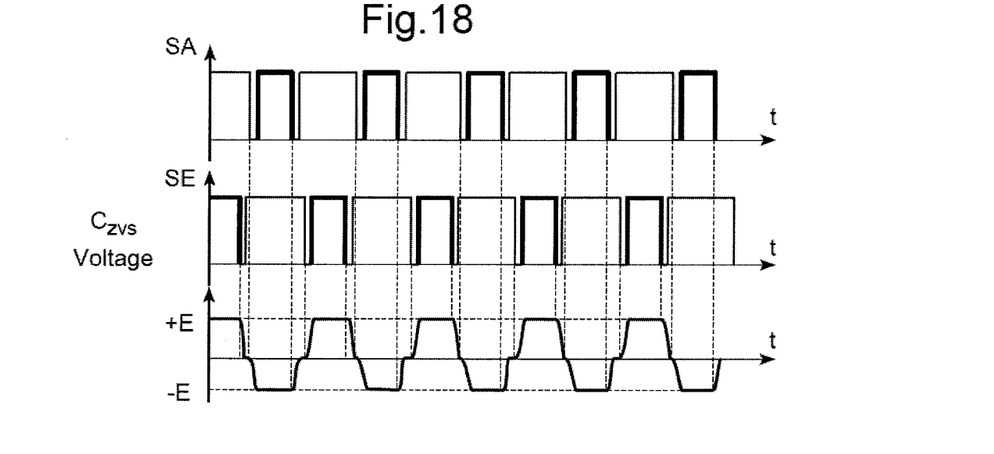
FIGS. 18 and 19 show cyclical variations of voltages and of currents at the terminals of elements of a converter according to embodiments of the invention.

When the switch SLA opens, the capacitor Czvs discharges itself completely and the blocking voltage of the switch SLA is E, as shown in FIG. 18.

Before the switch SLB closes, the current is negative in the inductive element LB and the switch SHB opens so that the current forced by this inductive element LB charges the capacitor Czvs until the voltage of the DC bus is achieved.

Figure 19:
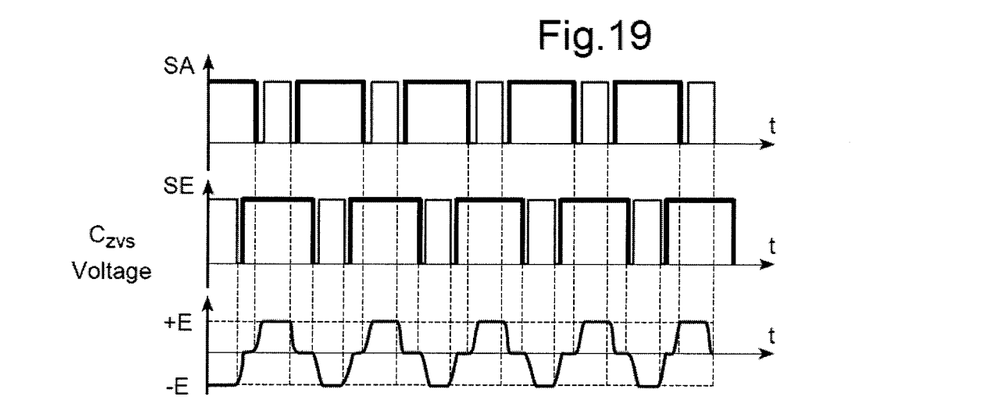

Similarly, FIG. 19 refers to the case in which the duty cycle is greater than 50%.

What is claimed is:

1. An electrical circuit designed to supply electrical propulsion power on board a motor vehicle, the electrical propulsion power being obtained from power delivered to the electrical circuit by a battery of the motor vehicle and converted by at least two cells, the electrical circuit comprising:
    inductive elements connected to transistors managing a current flowing in the inductive elements, wherein the inductive elements are coupled to form a magnetic circuit that is alternately controlled:
        according to a common mode in which an apparent inductance of the magnetic circuit is of an order of magnitude of a sum of inductances specific to each inductive element, or
        according to a differential mode in which the apparent inductance of the magnetic circuit is of an order of magnitude of a leakage inductance of a coupling between the coupled inductive elements,
    wherein the apparent inductance of the magnetic circuit controlled by the common mode is comparatively higher than the apparent inductance of the magnetic circuit controlled by the differential mode.

2. The electrical circuit according to claim 1, wherein the inductive elements are coupled such that they have a common terminal connected to the power-supply battery, and wherein each of the inductive elements have a terminal connected to a pair of transistors controlling charging and discharging of an associated capacitor, wherein the associated capacitor is configured to carry out a Zero Voltage Switching method.

3. The electrical circuit according to claim 2, wherein the associated capacitor has a first terminal shared with a first pair of transistors of a first cell and a second terminal shared with a second pair of transistors of the second cell, wherein the first terminal is connected to a midpoint of the first cell, and wherein the second terminal is connected to a midpoint of the second cell.

4. The electrical circuit according to claim 3, further comprising switches for using a distinct 50% duty cycle for charging and discharging the associated capacitor.

5. The electrical circuit according to claim 1, wherein the order of magnitude of the specific inductances is 500 µH.

6. The electrical circuit according to claim 1, wherein the order of magnitude of the leakage inductance is 50 µH.

7. The electrical circuit according to claim 2, further comprising switches for controlling the discharging for a period sufficient for inverting the current flowing in at least one inductive element according to a Zero Voltage Switching method in critical conduction mode.

8. The electrical circuit according to claim 1, wherein at least one of the inductive elements comprises an iron and silicon-based material.

9. The electrical circuit according to claim 8, wherein the iron and silicon-based material is ferrite.

10. The electrical circuit according to claim 1, further comprising a magnetic circuit formed by four half-coils, interlaced with air gaps of one and the same structure, so as to form the coupling of the two inductive elements.

11. A method for manufacturing an electrical circuit for supplying electrical propulsion power on board a motor vehicle, where the electrical power is obtained from power delivered to the electrical circuit by a battery of the motor vehicle and converted by at least two cells, the method comprising:

managing a current flowing in inductive elements which are connected to transistors,     wherein the inductive elements are arranged so as to couple the inductive elements to form a magnetic circuit according to claim 1.

\* \* \* \* \*